United States Patent [19]
Fell et al.

[11] 3,722,277
[45] Mar. 27, 1973

[54] TRANSMISSION HAVING DIRECTION CONTROL

[75] Inventors: Ferol S. Fell, Newton; Lowell J. Goering, Moundridge; William D. Long, Hesston, all of Kans.

[73] Assignee: Hesston Corporation, Hesston, Kans.

[22] Filed: May 11, 1971

[21] Appl. No.: 142,135

[52] U.S. Cl. ................................................. 74/220
[51] Int. Cl. ............................................. F16h 9/00
[58] Field of Search ........... 74/220, 242.15, 242.15 R

[56] References Cited

UNITED STATES PATENTS 2,583,272  1/1952  Metzler ............................ 74/220
2,742,985  4/1956  Robb ............................ 74/220 X
2,924,982  2/1960  Harrer ............................ 74/220
2,696,889  12/1954  Mott ............................ 74/220 X

*Primary Examiner*—Milton Kaufman
*Assistant Examiner*—Frank H. McKenzie
*Attorney*—Schmidt, Johnson, Hovey & Williams

[57] ABSTRACT

A power transmission is provided with a pair of belts interconnecting a drive and a driven sheave in an arrangement which permits selective rotation of the driven sheave in either direction by movement of corresponding idler pulleys alternately from a neutral position to their belt tightening positions. A lost motion assembly forming a part of an extensible toggle link connection with one of the belt tightening units makes it possible to use but a single actuator to control the entire operation.

17 Claims, 6 Drawing Figures

PATENTED MAR 27 1973

INVENTORS.
Ferol S. Fell
Lowell J. Goering
BY William D. Long

Schmidt, Johnson, Hovey & Williams
ATTORNEYS.

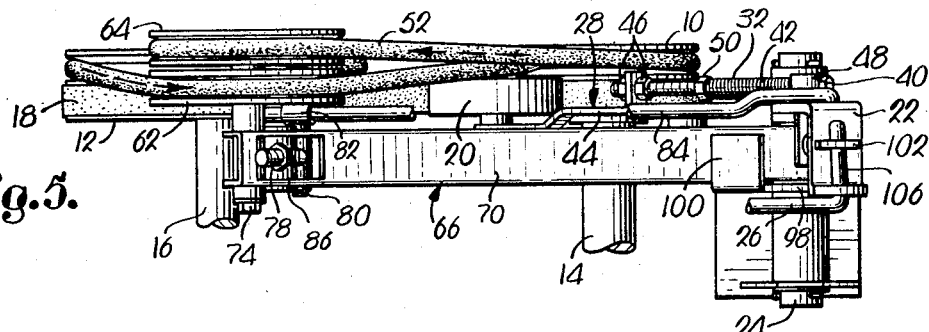
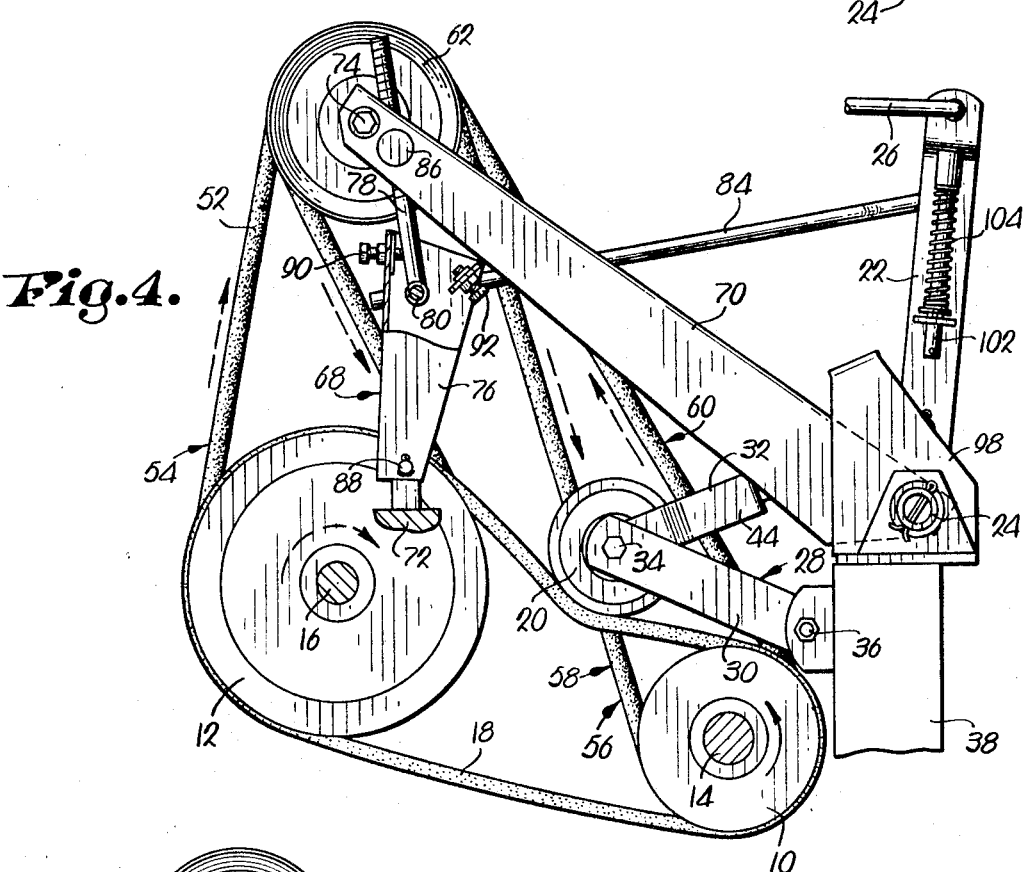
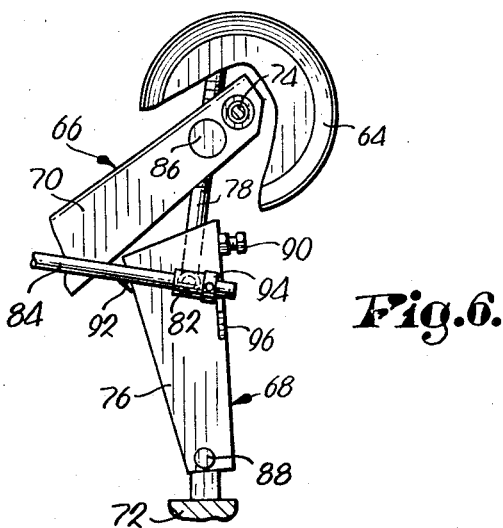

TRANSMISSION HAVING DIRECTION CONTROL

An important object of our present invention is the provision of a power transmission in which a single actuator, normally in a neutral position, may be used to tighten a forward drive belt when the actuator is moved to one end of its path of travel and to tighten a reverse drive belt when the actuator is moved to the opposite end of its path of travel.

Another important object of the instant invention is to provide a simple, yet effective lost motion assembly between the actuator and one of the belt tightening units which permits operation of both belt tightening units from neutral without need to first operate through the other unit.

Still another important object of our present invention is the provision of idler means for one of the units so arranged as to receive both the working side and the slack side of the belt such that it operates oppositely to a second belt, permitting both forward and reverse motion in a single, compact power transmission.

In the drawings:

FIG. 1 is a side elevational view of a transmission having direction control made in accordance with out present invention showing, in full lines, the position of components when the driven sheave is to be rotated in one direction (indicated by solid arrows), and illustrating by dash lines the position of such components when the transmission is in neutral (the dashed arrows indicating the movements of the components when the driven sheave is driven in the opposite direction);

FIG. 4 is an elevational view of that side of the transmission opposite to FIG. 1 with the components in a position for rotating the driven sheave oppositely to the direction of rotation taking place when the components are in the position shown by full lines in FIG. 1;

FIG. 5 is a top plan view showing the components as they are positioned in FIG. 4; and FIG. 6 is a fragmentary side elevational view similar to FIG. 1 but with the components positioned as in FIG. 4.

Figure 2:
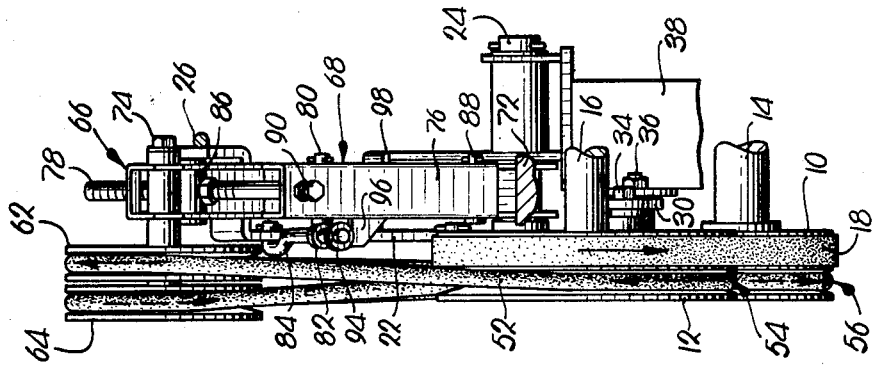
FIG. 2 is an elevational view of the right end of the transmission viewing FIG. 1, illustrating the components in the position shown by full lines in FIG. 1 (the solid and dashed arrows indicating the respective directions of component movement as aforesaid)
Figure 1:
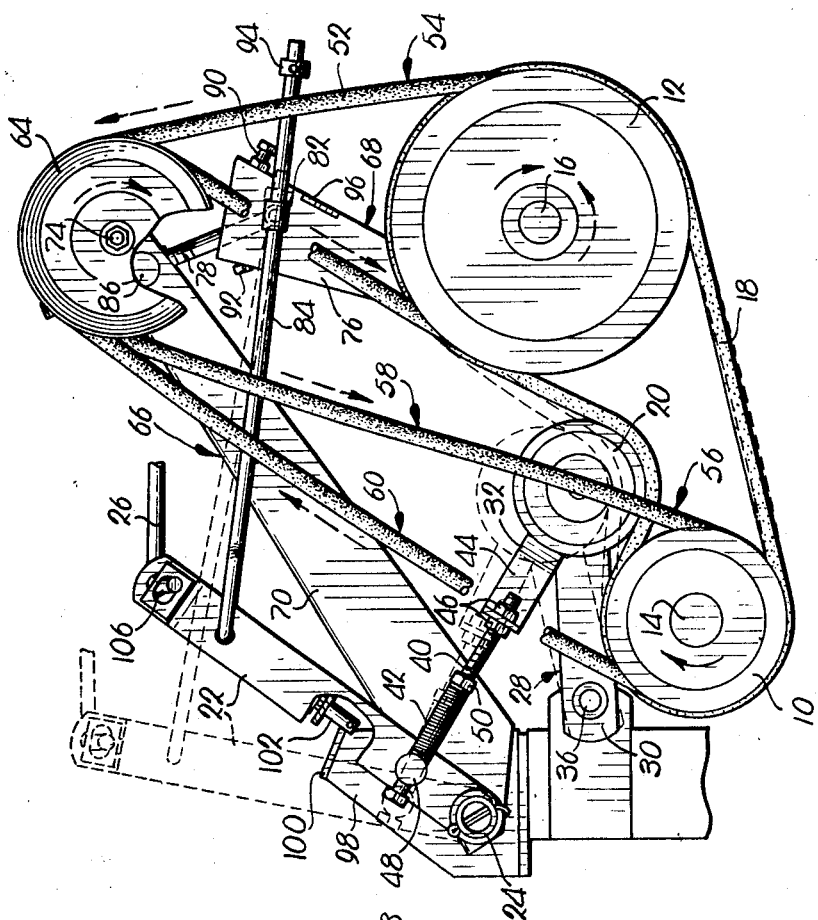
Figure 3:
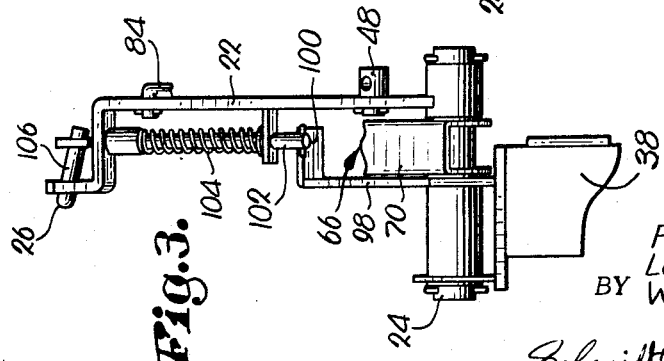
FIG. 3 is a fragmentary view illustrating the opposite end of the transmission with the components in neutral.

A drive member 10 and a driven member 12 in the nature of grooved sheaves are rigidly secured to corresponding shafts 14 and 16, the drive shaft 14 being adapted for operable connection with a shiftable prime mover (not shown) and the driven shaft 16 being adapted for connection with any type of machine, apparatus or equipment in which it is desirable or necessary to operate forwardly, in reverse or at standby when the transmission is in neutral with drive shaft 14 rotating continuously in one direction, for example, clockwise viewing FIG. 1 as indicated by the solid arrow.

A first continuous, flexible element, such as a belt 18, is trained on the sheaves 10 and 12 and on a rotatable idler 20, it being seen that when the belt 18 is tensioned by the idler 20, belt 18 rotates the driven sheave 12 in the same direction of rotation as that of the drive sheave 10, as is clear by full lines in FIG. 1 and the solid arrows.

An actuator 22, which may take the form of an upstanding lever swingable about the horizontal axis of a pivot pin 24, may be shifted manually or be power driven to the three positions illustrated in FIGS. 1 and 4 by use of a connecting rod 26 or the like pivotally connected to the lever 22 in spaced relationship to the pivot pin 24.

Mechanism 28 operably couples the lever 22 with the idler 20 for shifting the latter to a position tensioning the belt 18 when the lever 22 is moved to one end of its path of travel as shown in full lines by FIG. 1.

Mechanism 28 includes a pair of bars 30 and 32 pivotally connected to axle 34 of idler pulley 20, the bar 30 also having a pivotal connection 36 with framework 38 which also supports the pivot pin 24. Bar 32, on the other hand, is in two parts, one of which includes a bolt 40 having a spring 42 coiled thereon. The second part 44 of the bar 32 is L-shaped and adjustably receives the bolt 40 by virtue of a pair of nuts 46 on the bolt 40. Bolt 40 passes loosely through a transverse pin 48 rotatably carried by the lever 22, and the spring 42 is interposed between the pin 48 and a nut 50 on the bolt 40 used to adjust the tension of spring 42.

Accordingly, when the components are in the position illustrated by full lines in FIG. 1, spring 42 imparts a yieldable bias on the belt 18 through the idler 20, the extent of such pressure being dependent upon the tension in the spring 42, it being understood that bolt 40 has limited reciprocable movement within the pin 48 during the time that the idler pulley 20 is in belt tensioning engagement with the belt 18 and, therefore, causing the driven sheave 12 to be rotated by the drive sheave 10.

A second continuous, flexible element, such as a belt 52, has two loops 54 and 56 trained around the double grooved sheaves 10 and 12 respectively and, assuming that the driven sheave 12 is rotated clockwise viewing FIG. 4 as indicated by the dashed arrows, belt 52 has a working side 58 and a slack side 60. The working side 58 is looped on an idler pulley 62 whereas the slack side of belt 52 is looped on a second idler pulley 64. The belt 52 is twisted between sheave 10 and pulleys 62 and 64.

Structure 66 for operably coupling the lever 22 with the idlers 62 and 64 to shift the latter to the position shown in FIG. 4 tensioning the belt 52 when the lever 22 is in the position illustrated in FIG. 4 includes extensible linkage 68 in the nature of a toggle or elbow joint interposed between an arm 70 and framework 72. The arm 70 is swingable on the pivot pin 24 for movement of the idlers 62 and 64 toward and away from the sheaves 10 and 12, idlers 62 and 64 being freely rotatable about an axle 74 carried by the arm 70.

The linkage 68 includes a pair of links 76 and 78 having a pivotal interconnection 80 presenting a knee or elbow. The pivot 80 has a short tube 82 rotatable thereon which in turn receives an elongated rod-like device 84 for sliding movement in the tube 82, the device 84 pivotally connecting with lever 22.

Link 78 is in the nature of a bolt that passes through a pivot pin 86 and is provided with nuts on opposite sides of the latter for purposes of adjustment of the amount of tension applied to the belt 52 when the linkage 68 is in the position illustrated by FIG. 4.

The link 76 has a pivotal connection 88 with the framework 72 and is provided with a pair of opposed adjustable stops 90 and 92 which determine the extent of swinging movement of the link 78 relative to the link 76.

The device 84 is provided with an adjustable component 94 in the nature of a set collar alternately engageable with abutments which include a tube 82 and a lug 96 rigid to the link 76.

An upstanding bracket 98 on the framework 38 has a lateral extension 100 within the path of travel of the lowermost end of a vertically reciprocable spring-loaded locking rod 102 carried by the lever 22. Rod 102 may be raised to a position clearing the extension 100 against the action of spring 104 coiled on rod 102 by turning the control rod 26 about its longitudinal axis to raise a lateral projection 106 on rod 26 having pivotal connection with the lever 22 and the upper end of the rod 102.

OPERATION

When the lever 22 is in the neutral position illustrated by dash lines in FIG. 1, neither of the belts 18 nor 52 is under tension, permitting the drive sheave 10 to rotate idly without imparting any rotational power to the driven sheave 12. Moreover, the rod 102 represents a releasable lock, presenting movement of the lever 22 to the full line position shown in FIG. 1 by virtue of the fact that the extension 100 is within the path of travel of the rod 102.

On the other hand, when it is desired to tension the belt 18, it is but necessary to turn the control rod 26 to raise the locking rod 102 while the lever 22 is swung about the pivot pin 24 to the full line position shown in FIG. 1, whereupon the rod 102 is released, permitting spring 104 to position rod 102 in front of the extension 100 as shown in FIG. 1, thereby releasably locking the idler 20 in its belt tensioning position.

It is to be observed also at this juncture that as the lever 22 is thus moved forwardly, the device 84 slides freely within the tube 82 as the component 94 moves away from tube 82, thereby having no effect upon the linkage 68.

Retraction of the lever 22 in the opposite direction from the neutral position to that illustrated in FIG. 4 (in order to set sheave 12 and belt 52 in motion in the direction indicated by the dashed arrows) imparts a pull on the device 84 until such time as the component 94 engages the tube 82. Thereupon, as a pushing action is continued on the control rod 26 the adjustable set collar 94, pulling on the tube 82, straightens out the linkage 68, shifting the idlers 62 and 64 away from the sheaves 10 and 12 as the arm 70 swings about the pivot 24. Such pull on the device 84 is continued until the link 78 engages the stop 90 as shown in FIG. 4, and in this past center disposition of the linkage 68 there is again presented a releasable lock which holds the belt 52 properly tensioned so as to drive the sheave 12 oppositely to the direction of rotation of the drive sheave 10.

It is now to be noted in FIG. 6 of the drawings that the set collar 94 is disposed between the tube 82 and the lug 96. Therefore, as the lever 22 is returned to the neutral position with a consequent push on the device 84, set collar 94 first comes into engagement with the lug 96, breaking the lock of the linkage 68 by virtue of movement of the knee 80 away from the position shown in FIG. 6 to the position illustrated in FIG. 1.

Manifestly, the knee 80 and the lug 96 rotate about the axis of pivot 88 whereas the device 84 moves along its own axis within the tube 82 as the latter rotates; therefore, by the time the linkage 68 moves past the straight line position between pivot 88 and pivot 86 the lug 96 will have cleared the set collar 94, whereupon the device 84 is free to continue sliding along the tube 82 until the lever 22 reaches the neutral position shown by dash lines in FIG. 1. Again such lost motion assembly presented by the sliding movement of the device 84 within the tube 82 permits actuation of the linkage 68 to and from its operative position without in any way affecting the belt tensioning means provided by the idler 20. Moreover, belt 18 may be tensioned from the neutral position of lever 22 without first tensioning the belt 52 and, conversely, belt 52 may be tensioned from neutral without first tensioning the belt 18.

Having thus described the invention, what is claimed as new and desired to be secured by Letters Patent is:

1. In a power transmission,
   a rotatable drive member;
   a rotatable driven member;
   a first idler means mounted for movement through a displacement relative to said members;
   a first continuous, flexible element trained on said members and said first idler means, and arranged, when tensioned by said first idler means, to rotate the driven member in one direction;
   a second idler means remote from said first idler means and mounted for movement through its own displacement relative to said members and independently of said first idler means;
   a second continuous, flexible element trained on said members and said second idler means, and arranged, when tensioned by said second idler means, to rotate the driven member in the opposite direction;
   a movable actuator common to said first and second idler means;
   mechanism operably coupling the actuator with said first idler means for shifting the latter to a position tensioning said first element when the actuator is moved toward one end of its path of travel; and
   structure operably coupling the actuator with said second idler means for shifting the latter to a position tensioning said second element when the actuator is moved toward the opposite end of its path of travel.

2. In a power transmission as claimed in claim 1 wherein is provided a releasable lock for alternately holding said first idler means in said position tensioning the first element or holding both said first and second idler means in a neutral position with their corresponding elements untensioned.

3. In a power transmission as claimed in claim 1 wherein said structure is provided with a releasable lock for holding said second idler means in said position tensioning the second element.

4. In a power transmission as claimed in claim 1 wherein said structure includes a pair of articulated links presenting a toggle joint supporting said second idler means, a reciprocable device connected with said actuator and slidably coupled with one of said links, a pair of spaced abutments on said one link, and a pressure transmitting component on said device alternately engageable with said abutments for controlling the toggle joint as the device is reciprocated, one of said abutments being disposed for movement out of the path of travel of said component after flection of the links, permitting the actuator to shift said first idler means without shifting said second idler means.

5. In a power transmission as claimed in claim 1 wherein is provided a releasable lock for holding said first idler means in said position tensioning the first element.

6. In a power transmission as claimed in claim 5 wherein is provided a control operably connected with said actuator for moving the same, said control having means for releasing said lock.

7. In a power transmission as claimed in claim 1 wherein said structure includes extensible linkage supporting said second idler means, and a device connected with said actuator and engageable with said linkage when the actuator is moved toward said opposite end of its path of travel for extending said linkage.

8. In a power transmission as claimed in claim 7 wherein is provided a lost motion assembly between said device and said linkage for permitting the actuator to shift said first idler means without shifting said second idler means.

9. In a power transmission as claimed in claim 1 wherein said structure includes a toggle joint supporting said second idler means and provided with articulated links presenting a knee, and a device interconnecting said actuator and said toggle joint for controlling the latter to shift the second idler means by the flection and extension of said links.

10. In a power transmission as claimed in claim 9 wherein said knee is movable past center by said device and a stop is provided to limit said past center movement, presenting a releasable lock for holding said second idler means in said position tensioning the second element.

11. In a power transmission as claimed in claim 9 wherein said device is slidably connected to one of said links and wherein interengageable parts are provided on the device and on said one link for controlling the toggle joint, presenting a lost motion assembly between the device and said one link for permitting the actuator to shift said first idler means without shifting said second idler means.

12. In a power transmission as claimed in claim 1, wherein said first idler means includes a single rotatable idler wheel and said second idler means includes a pair of side-by-side, axially aligned, independently rotatable idler wheels.

13. In a power transmission as claimed in claim 12, wherein said second element has a working side, a slack side, and a single twist therein presenting a pair of loops, said loops being trained around said drive and driven members respectively and said working side of the second element being looped on one of the idler wheels of said second idler means with the slack side of said second element looped on the other idler wheel of said second idler means.

14. In a power transmission,
a rotatable drive member;
a rotatable driven member;
a single continuous, flexible element having a working side and a slack side,
said element having a single twist therein forming a first loop which is trained around the drive member and a second loop which is trained around the driven member,
a pair of side-by-side idlers rotatable independently of one another about aligned axes,
the working side of said element being looped on one of said idlers and the slack side of said element being simultaneously looped on the other of said idlers to drive said driven member oppositely to said drive member when the element is tensioned by the idlers;
structure including extensible means supporting said idlers for movement to and from a position tensioning said element; and
means coupled with said extensible means for actuating the latter.

15. In a power transmission as claimed in claim 14 wherein said extensible means is provided with a releasable lock for holding the same in a position tensioning said element.

16. In a power transmission as claimed in claim 14 wherein said structure includes an arm coupled with said idlers and mounted for swinging movement of the idlers toward and away from the drive and driven members, said extensible means being operably coupled with said arm for controlling the swinging thereof.

17. In a power transmission as claimed in claim 16 wherein said extensible means comprises an elbow joint having a pair of articulated links, one of the links being pivotally connected to said arm.

* * * * *